(12) United States Patent
Vanhelle

(10) Patent No.: US 10,310,604 B2
(45) Date of Patent: Jun. 4, 2019

(54) HUMAN-MACHINE INTERFACE FOR A MOTOR VEHICLE

(71) Applicant: DAV, Créteil (FR)

(72) Inventor: Stéphane Vanhelle, Créteil (FR)

(*) Notice: Subject to any disclaimer, the term of this patent is extended or adjusted under 35 U.S.C. 154(b) by 0 days.

(21) Appl. No.: 15/103,324

(22) PCT Filed: Dec. 12, 2014

(86) PCT No.: PCT/FR2014/000276
§ 371 (c)(1),
(2) Date: Jun. 10, 2016

(87) PCT Pub. No.: WO2015/086924
PCT Pub. Date: Jun. 18, 2015

(65) Prior Publication Data
US 2016/0306424 A1 Oct. 20, 2016

(30) Foreign Application Priority Data
Dec. 13, 2013 (FR) .................... 13 02925

(51) Int. Cl.
*G06F 3/01* (2006.01)
*B60Q 9/00* (2006.01)

(52) U.S. Cl.
CPC ............ *G06F 3/016* (2013.01); *B60Q 9/00* (2013.01); *G06F 3/01* (2013.01); *G06F 3/017* (2013.01)

(58) Field of Classification Search
None
See application file for complete search history.

(56) References Cited

U.S. PATENT DOCUMENTS

| 6,703,999 B1* | 3/2004 | Iwanami ................ B60K 35/00 345/156 |
| 2006/0047386 A1 | 3/2006 | Kanevsky et al. |
| 2008/0282966 A1* | 11/2008 | Williams ............ B60Q 1/0035 116/35 R |
| 2013/0222303 A1 | 8/2013 | Colgate et al. |

OTHER PUBLICATIONS

International Search Report issued in corresponding application No. PCT/FR2014/000276 dated Mar. 13, 2015 (6 pages).
Written Opinion of the International Searching Authority issued in corresponding application No. PCT/FR2014/000276 dated Mar. 13, 2015 (6 pages).

* cited by examiner

*Primary Examiner* — Kenneth B Lee, Jr.
(74) *Attorney, Agent, or Firm* — Osha Liang LLP

(57) ABSTRACT

A human-machine interface for a motor vehicle, comprising: —a command device (1) comprising at least one sensor configured to detect a command without contact by the user, and —a haptic feedback device (2) to control the consideration of said command, characterized in that —the haptic feedback device engages with a component (3) in the motor vehicle passenger compartment, said component being distinct from the command device, —said component being intended to come into contact with a part of in the body (5) of the user in order to perceive the haptic feedback signal.

10 Claims, 2 Drawing Sheets

HUMAN-MACHINE INTERFACE FOR A MOTOR VEHICLE

BACKGROUND

The invention relates to a human-machine interface for a motor vehicle for monitoring the recognition of at least one function of a motor vehicle.

More and more functions capable of controlling an equipment item arranged in the interior of motor vehicles can be controlled by contactless commands, for example by detecting a particular gesture performed by the driver or by a passenger.

However, it is difficult for the user wanting to activate a function by a contactless command to know whether this function has been correctly recognized by the detection system.

There are visual command entry feedback systems, for example based on the display of an indication of the command entry. However, this type of command entry feedback generally requires the user to divert the eyes from the road in order to see if his or her command has been recognized. This can be particularly dangerous, particularly if the user is the driver of the vehicle.

There are also auditory command entry feedback systems, for example based on the emission of a particular sound to confirm the recognition of the command. This type of feedback allows the user to remain focused on the road, but, depending on the ambient noise in the vehicle, these types of feedback can prove inadequate.

Thus, there is a need to provide an assembly for monitoring the recognition of at least one function of a motor vehicle reliably and safely.

SUMMARY OF DISCLOSURE

To this end, according to a first aspect, the subject of the invention is a human-machine interface for a motor vehicle comprising:
  a control device comprising at least one sensor configured to detect a contactless command from a user, and
  a haptic feedback device for monitoring the recognition of said command, noteworthy in that
  the haptic feedback device cooperates with an equipment item of the interior of the motor vehicle, said equipment item being distinct from the control device,
  said equipment item is intended to come into contact with a part of the body of the user in order to perceive the haptic feedback signal.

By virtue of the invention, the user can reliably and safely obtain feedback on the recognition of his or her command for a function in the interior of the motor vehicle. In effect, the monitoring signal perceptible by the body of said user allows the latter to perceive the signal and do so regardless of the ambient noise and without having to divert his or her gaze from the road.

The human-machine interface according to the invention can also comprise one or more of the features below, considered individually or in all technically possible combinations:
  the feedback device comprises a vibrating device configured to communicate one or more vibrations to the equipment item associated with the feedback device, the intensity of the vibrations being sufficient to be felt by said part of the body of the user; and/or
  the sensor comprises an infrared system and/or a capacitive system and/or a camera; and/or
  the control device is capable of canceling or of triggering a commanded function by virtue of the emission of an activation signal; and/or
  the human-machine interface is configured such that the time between the activation of the control device and the emission of the feedback signal by the feedback device is less than or equal to 100 ms, notably less than or equal to 90 ms; and/or
  the human-machine interface further comprises a programming device configured for the user to program the intensity and the duration of the feedback signal emitted by the feedback device and the time between the command and the emission of the feedback signal by the feedback device; and/or
  the feedback device is associated with a hand rest of the motor vehicle; and/or
  the feedback device is associated with the steering wheel of the motor vehicle; and/or
  the feedback device is associated with the driver's seat of the motor vehicle; and/or
  the feedback device is associated with the armrest of the motor vehicle.

Another subject of the invention consists of a method for manufacturing a human-machine interface for monitoring the recognition of the command by a user for at least one function of a motor vehicle, said method comprising steps for:
  providing a control device for said at least one function and
  providing a feedback device capable of sending a feedback signal that can be perceived by a part of the body of the user,
  associating the feedback device with an equipment item of the interior of the motor vehicle such that the feedback signal is perceptible by the part of the body of the user via said equipment item of the interior.

The invention relates also to a method for monitoring the recognition of the command by a user for at least one function of a motor vehicle, in which an assembly as described previously, particularly in any one of the combinations, is implemented.

More particularly, the invention relates also to a method for confirming the recognition of the command by a user for at least one function of a motor vehicle, said method comprising at least one step of sending, via a feedback device associated with an equipment item of the interior, of a feedback signal that can be perceived by a part of the body of the user following the command by the user for said function by means of a control device, said part of the body of the user being in contact with said equipment item of the interior.

The invention will be better understood on reading the following description given as a nonlimiting example of implementation thereof, and on studying the attached drawings.

DETAILED DESCRIPTION

Figure 1:
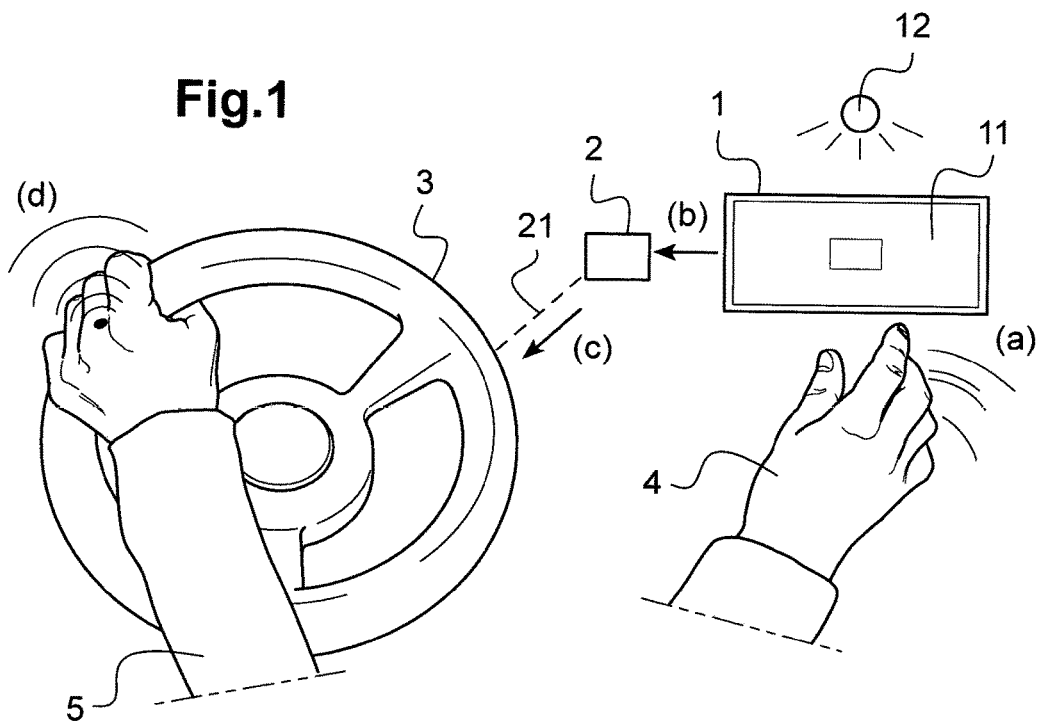
FIG. 1 illustrates a human-machine interface according to a first embodiment of the invention, in which the feedback device is associated with the steering wheel of a motor vehicle.

Referring to FIG. 1, the human-machine interface according to the invention makes it possible to recognize commands for at least one function of a motor vehicle such as a car.

The human-machine interface comprises a control device 1 and a feedback device 2. In particular, the control device is configured to emit an activation signal so as to trigger or cancel said function.

The control device 1 is of the type generally implemented in motor vehicles. In some cases, the control device 1 is adapted for contactless control. Thus, it can comprise a sensor 12 capable of detecting and recognizing gestures by the user.

For example, this type of sensor can comprise an infrared and/or capacitive sensor, and/or a camera or any other sensor of this type known to those skilled in the art. The control device 1 is configured to control at least one function of a motor vehicle. The functions that can be implemented in the context of the invention notably comprise functions concerning the car radio and/or the navigation system and/or the heating and/or the air conditioning and/or the seat configuration and/or the interior and/or the door and/or the window and/or the onboard computer.

As illustrated in FIG. 1, the control device 1 can comprise a display device 11 such as a screen, serving as interface and allowing the user to view the commands and their recognition by the human-machine interface according to the invention. The display device 11 allows the user to view the effectiveness of said function of the motor vehicle, preferably outside of periods of driving. In effect, during the periods of driving, it is preferable to use a non-visual feedback signal confirming the recognition of the command.

In particular, a signal by a contact link with the user is preferred for example when the sound environment does not lend itself to an auditory feedback signal. Furthermore, in the case of a contactless command such as by gesture sensors, a vibratory feedback via a control device such as a joystick is ineffective given the absence of contact. Thus, the inventors have noted that feedback via an equipment item of the interior offers a benefit in terms of safety.

The feedback device 2 of the human-machine interface according to the invention is configured to send to the user a feedback signal that can be perceived thereby, in particular in the form of a vibratory signal, via an equipment item 3 of the interior. The equipment item 3 of the interior is preferably an element of the interior which is frequently in contact with a part of the body of the user. Thus, this equipment item transmits a feedback signal to the user via this contact.

Obviously, an equipment item is chosen according to its capacity to transmit said feedback signal in a significant manner. In particular, a transmission by a rigid equipment item such as the steering wheel that easily makes it possible to transmit a vibrating feedback signal. Alternatively, a lesser rigidity can be compensated by a greater vibratory intensity. In the embodiment of FIG. 1, the equipment item 3 of the interior is a steering wheel. The feedback device 2 is for example connected directly to the equipment item 3 of the interior so as to transmit the perceptible feedback signal.

According to a preferred variant, the feedback device 2 comprises a vibrating device capable of communicating vibrations to at least one equipment item of the interior.

As a variant, it is possible to provide an intermediate means receiving a signal from the feedback device and capable of transmitting a confirmation signal to the equipment item 3 of the interior which, in response, will generate the feedback signal.

The feedback device 2 is a module comprising electronic components capable of receiving and processing the information from the control device 1.

Advantageously, the choice of the steering wheel as equipment item 3 transmitting the feedback signal makes it possible to transmit the information to the user via his or her second hand 5, placed thereon. In practice, hand perception is significantly sensitive compared to the rest of the body of the user. Furthermore, the hand is generally not covered with clothing in a driving situation. Finally, the steering wheel is the element of the interior most often in contact with the hands of the driver.

In practice, the signal will be perceived by the user when its intensity is greater than a predetermined threshold. This predetermined intensity threshold is a function among other things of the equipment item used to transmit the vibrations and of the part of the body of the user in contact therewith.

Advantageously, the feedback device 2 comprises a vibrating device 21 configured to communicate one or more vibrations to the equipment item of the interior. It is possible to provide a vibrating device 21 incorporated in a mechanical system secured to the steering wheel.

For example, this vibrating device 21 can be incorporated in a power steering system or in the other force feedback systems. As a variant, the vibrating device 21 can also be incorporated in the steering wheel. According to another possibility, the vibrating device 21 is incorporated in a control system on the steering wheel incorporating a haptic feedback device. In this latter case, it is preferable to implement a more powerful signal to improve the transmission from the center to the periphery of the steering wheel.

As a variant, it is also possible to provide for the use of an already existing vibrating device. For example, a power steering system, a force feedback system or a haptic control system on the steering wheel.

According to one embodiment, the human-machine interface according to the invention is configured such that the time between the activation of the control device and the emission of the feedback signal by the feedback device is less than or equal to 100 ms, more particularly less than or equal to 90 ms. Advantageously, a delay less than or equal to 100 ms between the activation and the emission of the feedback signal allows the user to clearly identify the feedback as corresponding to the activation of the command.

It is also possible to provide the possibility of configuring the intensity and/or the duration of the feedback signal and/or the time between the command and the emission of the feedback signal. An interface of a known type can be implemented for this purpose. These aspects make it possible to configure the human-machine interface according to the invention according to the preferences of a given user. Similarly, it is also possible to provide for the duration of the vibrations to be able to be configured by the user.

In use, when the user actuates the control device 1 by means of his or her first hand 4, the control device identifies (a) the gestures by the user and transmits (b) a confirmation signal to the feedback device 2. Then, the feedback device 2 transmits (c) a vibration signal to an equipment item 3 of the interior, here a steering wheel. Thus, the equipment item 3 of the interior vibrates (d) in a way that can be perceived by a part of the body of the user, via said equipment item, here the steering wheel in contact with the second hand 5 of the user.

Thus, generally, the method according to a variant of the invention comprises the implementation of the steps (a) to (d) described previously.

The control device 1 cooperates with the feedback device 2, in particular by means of a transmission of the signal from the control device 1 to the feedback device 2, so as to communicate the confirmations of the recognition of the commands. This cooperation is schematically represented by the arrow of reference (b) in the figures.

Figure 2:
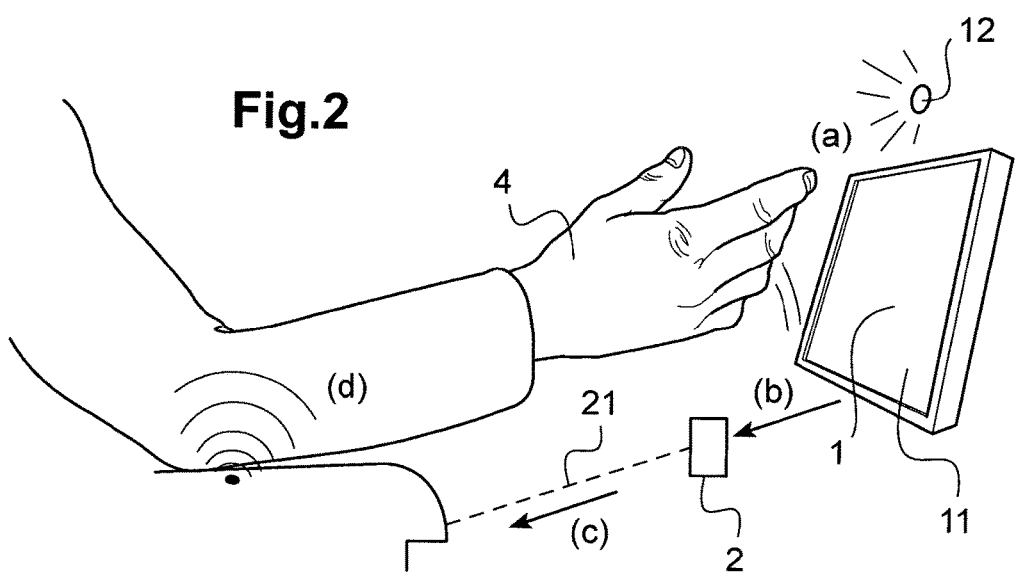
FIG. 2 illustrates a human-machine interface according to a second embodiment of the invention, in which the feedback device is associated with the armrest of a motor vehicle.

Referring to FIG. 2, the human-machine interface according to a second embodiment is similar to that described previously with an equipment item 3 transmitting a perceptible feedback signal, which is an armrest, for example a central armrest. The physical link between the body of the user and the armrest can be the elbow or the forearm.

An armrest, as equipment item 3 of the interior, is comfortable, and the position of the user is natural, the elbow and/or the forearm being at rest on the armrest. Furthermore, the choice of an armrest as equipment item 3 makes it possible to make the human-machine interface according to the invention usable by a passenger.

Furthermore, the armrest offers a rigidity allowing for the transmission of a vibrating feedback signal.

In use, the user commands a function, for example by a gesture of the hand 4 via an interface of a display device 11 such as an offset screen, a multifunction tablet or a joystick combined with a control means, particularly gesture-based. The changes of function or validations are confirmed to the driver by a perceptible signal, preferably vibratory. This signal can be programmable or unique, transmitted via the elbow and/or the forearm of the user.

Obviously, this embodiment is not limited to the central armrest. For example, it can be implemented on the left side, notably for door or air conditioning function controls.

Figure 3:
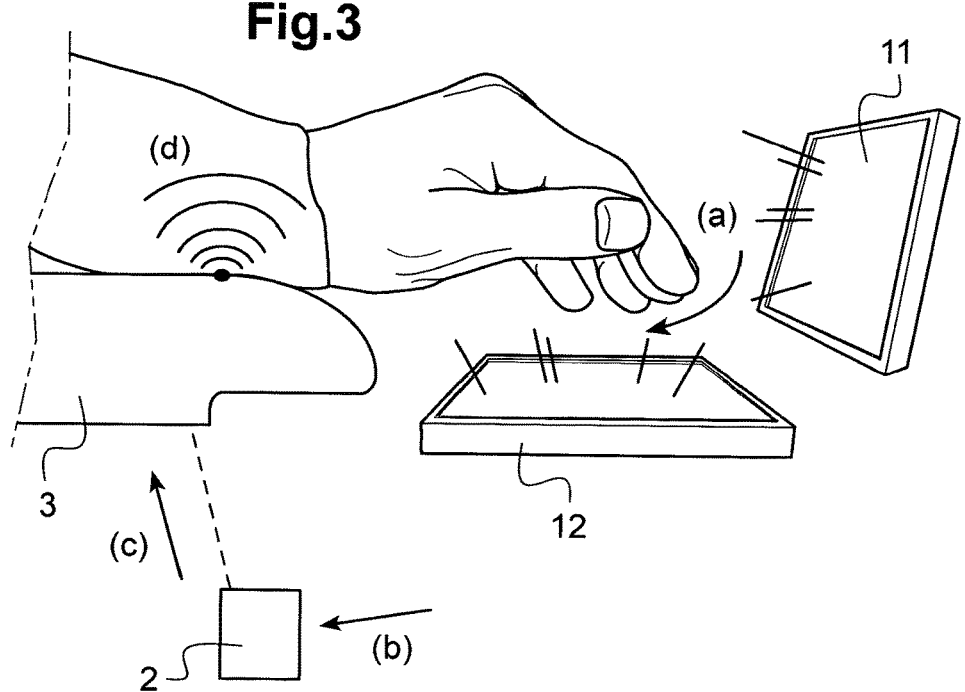
FIG. 3 illustrates a human-machine interface according to a third embodiment of the invention, in which the feedback device is associated with a palm rest of a motor vehicle.

Referring to FIG. 3, the human-machine interface according to a third embodiment is similar to that described previously with an equipment item 3 of the interior transmitting a perceptible feedback signal, which is a palm rest. This assembly can be implemented in the same way as an assembly according to the second variant, with the single difference that it is a palm rest as equipment item 3 of the interior. This variant is also comfortable, it being understood that all of the arm is generally at rest when the first hand of the user is on the palm rest. A hand rest (or "palm rest") is a rigid part of the interior where the wrist is placed making it possible to have a bearing point for driving a touch pad or a joystick. Such a hand rest is generally on the central console situated between the two front seats of the vehicle.

Figure 4:
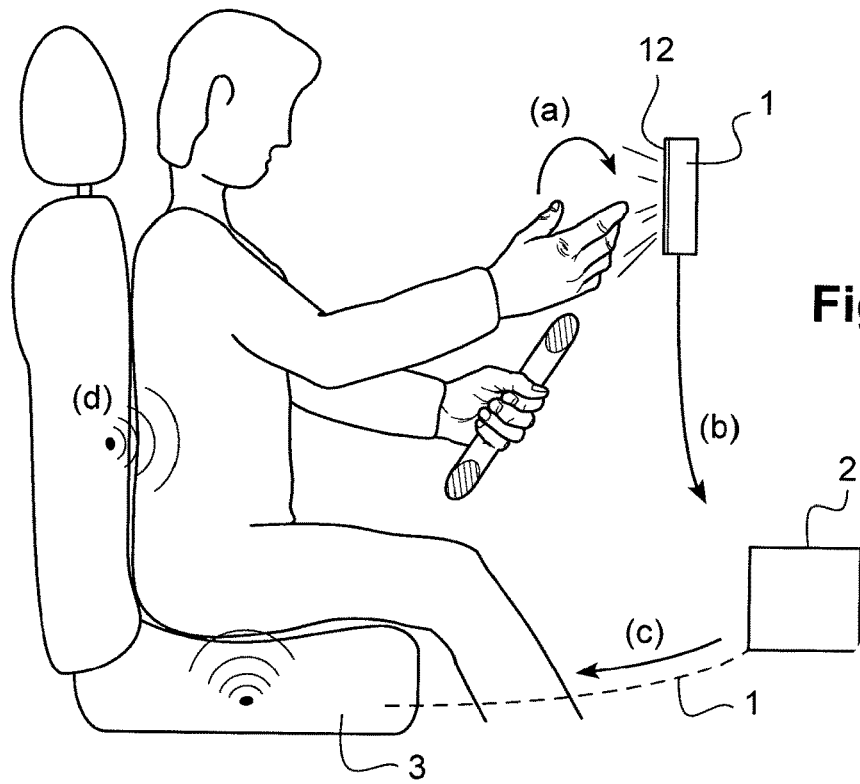
FIG. 4 illustrates a human-machine interface according to a fourth embodiment of the invention, in which the feedback device is associated with the driver's seat of a motor vehicle.

Referring to FIG. 4, the human-machine interface according to a fourth embodiment is similar to those described previously with an equipment item of the interior 3 transmitting a perceptible feedback signal, which is a seat.

A seat offers the advantage of being constantly in contact with the body of the user whether the latter is driver or passenger. Furthermore, this embodiment does not require any particular position of one or other of the hands of the user.

Given the softness of the seat, the intensity of the vibrations has to be significantly great to be perceived by the user.

In this embodiment, a vibrating device 21 or an actuator can be incorporated in the seat, for example an actuator similar to those used in lane departure alert systems on the road.

The feedback device 2 can be associated with the seat of the driver and/or the seat of a passenger. Thus, a passenger performing commands can also be informed by the feedback device.

The actuators can be provided in the seat and/or in the back. It is also possible to provide actuators in the headrest. The back offers the advantage of generally more frequent contact with the user than the headrest. The same applies for the seat compared to the back.

Obviously, the invention is not limited to the embodiments described and extends to other variants within the scope of the claims.

Herein, the word "comprising" does not preclude other elements, and the indefinite article "a" or "an" does not preclude a plurality. The simple fact that the different features are cited together in different dependent claims does not indicate that the combination of these features cannot be used advantageously. Any reference symbol in the claims should not be interpreted as limiting the scope of the invention.

What is claimed is:

1. A human-machine interface for a motor vehicle comprising:
   a control device comprising at least one sensor configured to detect a contactless command from a user, and an interface of a display device for the contactless command, the interface selected from the group consisting of an offset screen, a multifunction tablet or a joystick;
   a haptic feedback device for monitoring the recognition of said command,
   wherein the haptic feedback device cooperates with an equipment item of the interior of the motor vehicle, said equipment item being distinct from the control device, and
   wherein said equipment item is intended to come into contact with a part of the body of the user in order to perceive the haptic feedback signal; and
   a programming device configured for the user to program the intensity and the duration of the feedback signal emitted by the feedback device and the time between the command and the emission of the feedback signal by the feedback device.

2. The human-machine interface as claimed in claim 1, wherein the haptic feedback device comprises a vibrating device configured to communicate one or more vibrations to the equipment item associated with the feedback device, the intensity of the vibrations being sufficient to be felt by said part of the body of the user.

3. The human-machine interface as claimed in claim 1, wherein the sensor comprises an infrared system and/or a capacitive system and/or a camera.

4. The human-machine interface as claimed in claim 1, wherein the control device is capable of canceling or of triggering a commanded function by virtue of the emission of an activation signal.

5. The human-machine interface as claimed in claim 1, configured such that the time between the activation of the control device and the emission of the feedback signal by the feedback device is less than or equal to 100 ms, notably less than or equal to 90 ms.

6. The human-machine interface as claimed in claim 1, wherein the feedback device is associated with a hand rest of the motor vehicle.

7. The human-machine interface as claimed in claim 1, wherein the feedback device is associated with the steering wheel of the motor vehicle.

8. The human-machine interface as claimed in claim 1, wherein the feedback device is associated with the driver's seat of the motor vehicle.

9. The human-machine interface as claimed in claim 1, wherein the feedback device is associated with an armrest of the motor vehicle.

10. A human-machine interface for a motor vehicle comprising:
- a control device comprising at least one sensor configured to detect a contactless command from a user, and an interface of a display device for the contactless command, the interface selected from the group consisting of an offset screen, a multifunction tablet or a joystick; and
- a haptic feedback device for monitoring the recognition of said command,
- wherein the haptic feedback device cooperates with an equipment item of the interior of the motor vehicle, said equipment item being distinct from the control device,
- wherein said equipment item is intended to come into contact with a part of the body of the user in order to perceive the haptic feedback signal, and
- wherein the time between the activation of the control device and the emission of the feedback signal by the feedback device is less than or equal to 90 ms.

* * * * *